United States Patent
Sievenpiper et al.

(10) Patent No.: US 8,037,589 B2
(45) Date of Patent: Oct. 18, 2011

(54) SYSTEM AND METHOD FOR INSTALLING A DEVICE

(75) Inventors: Crispian Lee Sievenpiper, Waukesha, WI (US); Sandra Fieldstad Wiley, Eagle, WI (US)

(73) Assignee: General Electric Company, Schenectady, NY (US)

( * ) Notice: Subject to any disclaimer, the term of this patent is extended or adjusted under 35 U.S.C. 154(b) by 1753 days.

(21) Appl. No.: 11/124,783

(22) Filed: May 9, 2005

(65) Prior Publication Data

US 2006/0248699 A1    Nov. 9, 2006

(51) Int. Cl.
*B23Q 17/00*    (2006.01)
*G06F 19/00*    (2006.01)

(52) U.S. Cl. ...................... 29/407.01; 700/95

(58) Field of Classification Search ................. 29/407.1, 29/709, 701, 714, 96, 430, 720, 407.4, 429, 29/897.2, 712, 703; 700/95, 114, 96; 235/376
See application file for complete search history.

(56) References Cited

U.S. PATENT DOCUMENTS

| | | | |
|---|---|---|---|
| 6,366,242 B1 * | 4/2002 | Boyd et al. | 342/450 |
| 6,481,083 B1 * | 11/2002 | Lawson et al. | 29/407.04 |
| 6,886,231 B2 * | 5/2005 | Lawson et al. | 29/407.01 |
| 2003/0102367 A1 * | 6/2003 | Monette et al. | 235/376 |
| 2005/0150094 A1 * | 7/2005 | Moore et al. | 29/407.04 |

FOREIGN PATENT DOCUMENTS

DE    10122059    * 2/2002

* cited by examiner

*Primary Examiner* — John C Hong
(74) *Attorney, Agent, or Firm* — Fletcher Yoder

(57) ABSTRACT

A technique is provided for installing a device in which a part of the device and the location of the part are automatically determined. An installer is notified of the part and its location for installation. Routines implementing some or all of the technique may be provided on a computer-readable medium. A method is also provided for locating a part to be installed using a project manager application. An installer retrieves the part from the location and installs the part. In one embodiment, the present techniques are implemented using an installation system including a processor-based system and a locator system. The processor-based system is configured to indicate a location of a part to be installed while the locator system is configured to provide the location to the processor-based system.

14 Claims, 2 Drawing Sheets

SYSTEM AND METHOD FOR INSTALLING A DEVICE

BACKGROUND

The invention relates generally to the installation and/or assembly of equipment.

In a variety of industrial, commercial, medical, and research contexts, various pieces of equipment may be employed to accomplish or facilitate the work being performed at a facility. In many instances, the equipment may consist of many parts or for various other reasons may require extensive on site-assembly and installation. For example, in a medical context, an imaging device, such as a magnetic resonance imaging (MRI) system, may be shipped from the manufacturer as many parts which are assembled and installed on-site. Such installations are typically performed by highly trained technicians and may be very time consuming. In particular, an installation procedure may involve much wasted movement and looking for parts. Furthermore, such installations may be difficult to stage, schedule, and monitor. As a result, the trained technician may spend unnecessary time performing installation procedures.

Because the number of technicians trained to assemble and install a complex piece of equipment, such as a medical imaging system, may be limited, it may be desirable to facilitate or ease the assembly and installation process. However, additional assembly at the manufacturing site may be infeasible due to shipping size constraints or to the fragility of the system in transit. Likewise, the use of less skilled technicians or lay people to perform the assembly and installation may be infeasible due to the complexity of such systems and the risk of damage or improper assembly to what is usually expensive equipment. A technique for streamlining the assembly and installation of complex systems or devices is, therefore, desirable.

BRIEF DESCRIPTION

An installation system is provided which includes a processor-based system and a locator system. The processor-based system is configured to indicate a location of a part to be installed. The locator system is configured to provide the location to the processor-based system.

A method is provided for installing a part of a device. The method comprises automatically determining a part of a device to be installed. A location of the part is also automatically determined. An installer is notified of the part and the location. Computer-readable media are also provided for implementing the method.

Another method is provided for installing a part of a device. The method comprises locating a part to be installed using a location provided by a project manager application. The part is retrieved from the location and installed in accordance with directions provided by the project manager application.

DRAWINGS

Figure 1:
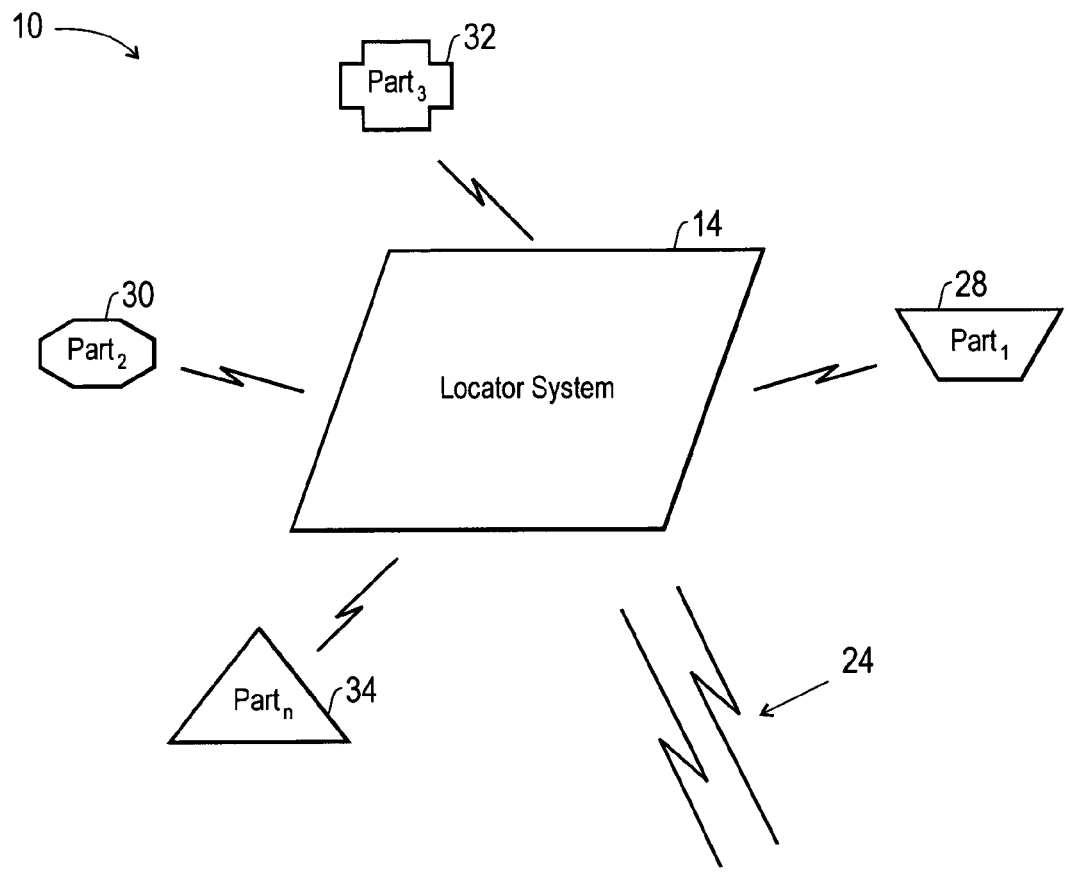
Figure 1:
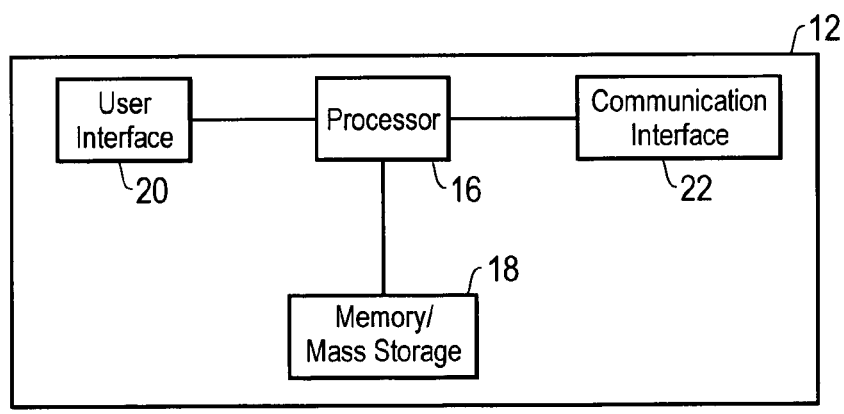
Figure 1:
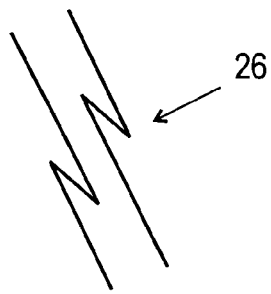
Figure 2:
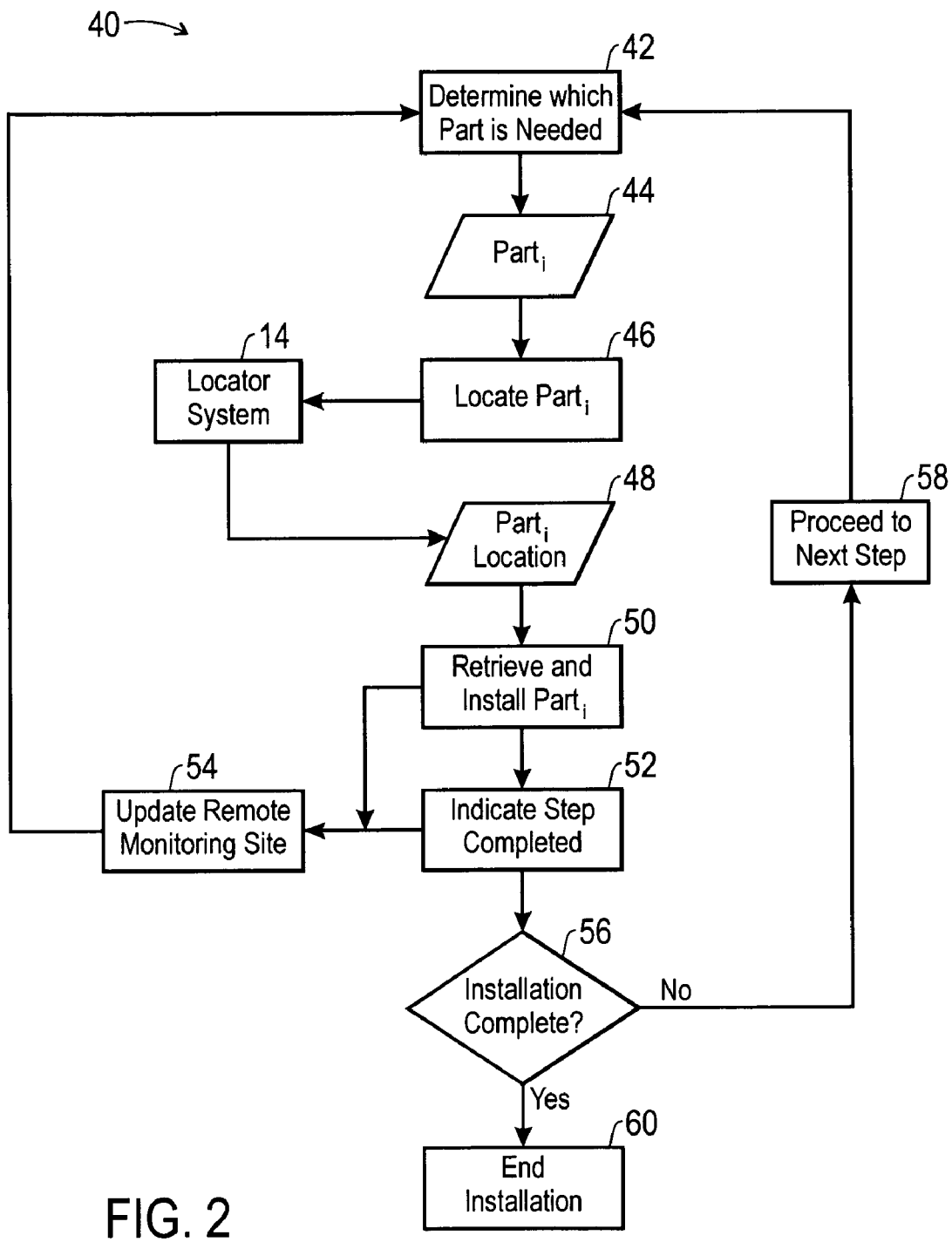

These and other features, aspects, and advantages of the present invention will become better understood when the following detailed description is read with reference to the accompanying drawings in which like characters represent like parts throughout the drawings, wherein:

FIG. 1 depicts an exemplary implementation of the present technique employing a processor-based interface and a locator system; and FIG. 2 is a flowchart depicting exemplary steps in accordance with the present technique.

DETAILED DESCRIPTION

The present technique provides for facilitating the installation of a complex system at a remote site, such as at a customer site. In particular, the present technique employees an automated or semi-automated project manager and a locator system to provide guidance during and/or monitoring of the installation process. For example, in one embodiment, an on-site installer, utilizing the project manager and locator system, may be systematically guided through different steps of the installation process, including being provided with part locations and with confirmations upon successful completion of an installation step. Similarly, an off-site monitoring facility may, in some implementations, be provided with updates and feedback regarding the progress of the installation and/or of installation problems requiring additional attention or intervention.

Referring now to FIG. 1, an exemplary installation system 10 for implementing the present technique is depicted. The depicted installation system 10 includes an exemplary processor-based system 12 configured to run routines implementing a project manager application. The project manager application comprises one or more routines for guiding an installer through the installation process for a mechanical or electrical system or other piece of equipment. For example, in one embodiment, the project manager application implements a standard operating procedure in a sequential and interactive form such that an installer is provided with instructions for completing a step. In one implementation, the location of one or more parts to be installed in the current step are provided along with the installation instructions. The instructions may be provided as text, as a graphic or video clip demonstrating the installation of the part to the installer, and/or as audible instructions.

Completion of the step may be indicated by the installer to the project manager application, such as by pressing a key on a keyboard or touchscreen, allowing the project manager to proceed to the next step. In addition, a self-test or diagnostic routine may be used instead of or in addition to such a notification by the installer to indicate or confirm the completion of a step to the project manager application. For example, the project manager application may be in communication with the system being installed and configured to receive the results of diagnostic or self-test routines performed by the system to indicate the proper installation and functionality of each component or part as it is installed. A successful self-test or diagnostic result, therefore, may prompt or allow the project manager application to proceed to the next step. A failed self-test or diagnostic result may result in a notification to the installer of an incomplete or unsuccessful installation step and/or may result in a notification or assistance request being sent to a remote site monitoring the installation. In this way, successful installation of a functioning system may be facilitated.

As noted above, some or all of the routines of the project manager application may be executed on a processor-based system 12 present at the site with the installer. In other implementations the results of a remotely running project manager application may be communicated to and displayed (or otherwise provided to) the installer via the processor-based system 12. In one embodiment, the processor-based system 12 is a general purpose computer, such as an on-site desktop or portable computer. In other embodiments, the processor-based system 12 is an application specific computer designed to implement the routines of the project manager application using dedicated circuitry and/or software. In yet another embodiment, the processor-based system 12 is a portable digital assistant (PDA) or other handheld electronic device capable of running the project manager application. While the foregoing provide examples of possible embodiments of the processor-based system 12, one of ordinary skill in the art will appreciate that other electronic devices capable of serving as an interface between an installer and the project manager application may function as the processor-based system 12. Indeed, in one embodiment, some or all of the routines of the project manager application may be executed remotely, such as at a backoffice, and the processor-based system 12 may serve primarily as a communication interface between the backoffice, the locator system 14 (discussed below), and/or the installer.

In the depicted embodiment, the processor-based system 12 includes a variety of components, including a processor 16, such as a microprocessor or other central processing unit (CPU). The depicted processor-based system 12 also includes readable and/or writable data storage 18, such as in the form of memory (such as in the form of memory chips or circuitry) and/or mass storage devices (such as a hard drive and/or an optical disk drive (CD, DVD, and so forth)). In the depicted embodiment, the data storage 18 is contained within the processor-based system 18. However, as will be appreciated by those of ordinary skill in the art, some or all of the components forming data storage 18 may be remote from the other components of the processor-based system 12. For example, the data storage 18 may include remote hard drives or optical drives accessible to the processor-based system 12 via a wire or wireless network connection or other data communication mechanism. Furthermore, as will be appreciated by those of ordinary skill in the art, the data storage 18 may store routines for performing some or all of the functions of the project manager application (such as for execution by processor 16), data and log files related to an ongoing or previous installation, and/or data or instructions generated by a remotely running project manager application.

In addition, the depicted processor-based system 12 includes a user interface 20. In some embodiments, the user interface 20 includes a liquid crystal display or a monitor to allow a user to view the prompts, instructions, or other messages generated by the project manager application. Some embodiments may also include a speaker or other audible interface component as part of the user interface 20 to allow message or commands to be audibly conveyed to an installer. In some embodiments, the user interface 20 also include input components to allow the installer or operator to interact with the processor-based system 12 and to, thereby, interact with the project manager application, the locator system 14, and/or a remote site in communication with the processor-based system 12. Examples of such input components include a pointing device, such as a mouse or a touch-sensitive screen, a keyboard, and/or a keypad.

The depicted processor-based system 12 also includes a communication interface 22 for communicating with other systems, equipment, and/or locations. The communication interface 22 may include more than one type of interface, such as one or more of a wireless connection, a modem connection, a satellite link, a network connection, and so forth. Similarly, the communication interface 22 may allow communication between the processor-based system 12 and another location or device over a variety of mediums, such as over a wire or wirelessly via a radio, infrared, optical, microwave, or other signals.

In the depicted embodiment, the communication interface 22 allows communication between the processor-based system 12, the locator system 14, and/or a remote facility, such as a backoffice. For example, the processor-based system 12, via communication interface 22, may query the locator system 14 for the location of a particular part and/or may receive the location of some or all of the parts tracked by the locator system 14, as depicted generally by communication arrows 24. In one embodiment, such location queries or data may be transmitted or received by one or more routines of a program manager application being executed by the processor 16 of the processor-based system 12. Similarly, in the depicted embodiment, the processor-based system 12 communicates with a remote facility, as depicted generally by the communication arrows 26. In one embodiment, such communication with a remote facility includes installation updates (such as step completion times and/or diagnostic data) provided to a remote application or operator, requests for remote assistance, and/or feedback information useful in evaluating or improving the installation process. In some embodiments, the communication interface 22 communicates with components of the system being installed during the installation process. In such embodiments, the communication interface 22 allows self-test and/or diagnostic results to be queried from and/or received from the system during installation. Such results may then be conveyed to routines of the project manager application running on the processor-based system 12 or at a remote site.

The installation system 10 also includes a locator system 14 that is used to locate different components, such as $part_1$ 28, $part_2$ 30, $part_3$ 32, $part_n$ 34, and so forth, of the system being installed. For example, in one embodiment, some or all of the parts of the system being installed are tagged using radio frequency identification (RFID) chips. In such an embodiment, the tagged parts, such as $part_1$ 28, $part_2$ 30, $part_3$ 32, $part_n$ 34, and so forth, are tracked by a locator system 14 employing suitable RFID tracking hardware and software. For example, in one RFID implementation the locator system 14 include one or more antennas connected to radio frequency reception circuitry. The location of each RFID chip, and the part to which it is attached, is provided to the project manager application, which in turn provides the location information to the installer. In this way, the project manager application can instruct the installer where the next part or parts to be installed are located, thereby eliminating or reducing time spent searching for the part and/or the misidentification of parts. In such an implementation, the RFID tags or chips may be removed from the part after retrieval and prior to installation.

In other embodiments, other technologies may be employed in the locator system 14. For example, acoustic systems employing microphones and ultrasonic chirpers are employed by the locator system 14 in one embodiment. Similarly, GPS transponders and receivers are used by the locator system 14 in another embodiment to track and locate the parts being installed. As will be appreciated by those of ordinary skill in the art, various technologies may be employed by the locator system 14 so long as the locator system 14 provides a location for each tracked part to the project manager application, and thereby to the installer, which allows each part to be identified and located.

An exemplary installation system 10, such as that depicted in FIG. 1, may be used in the installation of complex system or piece of equipment. For example, referring now to FIG. 2, an exemplary installation process 40 is depicted which may be performed using an installation system 10 and a suitable project manager application, as described herein. For example, in the depicted installation process 40, a project manager application, such as may be implemented on a processor-based system 12 (depicted in FIG. 1) or remote from the installation, determines which part is needed for the installation to proceed (step 42). In general, such a determination is made in accordance with the standard operating procedure for the installation implemented by the project manager application.

The parts 44 identified at step 42 is located (step 46), such as by querying the locator system 14. Once $part_i$ 44 is located, the project manager application notifies the installer that $part_i$ 44 should be retrieved from location 48 and installed (step 50). The project manager application may provide additional direction, such as textual, video, or audio instructions, detailing the installation of $part_i$ 44.

The installer, or a self-test or diagnostic routine, notifies the project manager application that $part_i$ 44 has been installed (step 52). In embodiments where a self-test or diagnostic routine communicates with the project manager application, the notification may also include data on whether the $part_i$ 44 is installed correctly and/or is functioning properly. In such embodiments, a failure indication by the self-test or diagnostic routine may prompt additional instruction from the project manager application, such as troubleshooting guidance or instructions to the installer to check the installation. In such an implementation, installation may be halted until the self-test or diagnostic routines indicate a successful installation of $part_i$ 44 or until the installer overrides the failure indication.

In one embodiment, the project manager application updates a remote monitoring site (step 54). Such updates allow a remote monitor to track the progress of the installation, to monitor the time required to complete each installation step, to intervene or provide additional instruction or guidance, and/or to issue replacement parts for any parts which are defective or damaged, such as where a self-test or diagnostic routine indicates that a part is installed but not functional.

In the exemplary installation process 40, after notification of the successful installation of $part_i$ 44, a determination is made by the project manager application at decision block 56 whether the installation is complete. If the installation is not complete the project manager application proceeds to the next installation step (step 58), such as by determining which part is needed next and proceeding as described herein. If the installation is determined to be complete at decision block 56, the installation is ended (step 60).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An installation system, comprising,
   a processor-based system configured to:
   indicate a location of a part of a device to be installed in the device;
   provide instructions for the installation of the part;
   verify the installation of the part; and
   a locator system configured to provide the location to the processor-based system;
   a processor configured to execute one or more routines related to the installation of the part;
   a communication interface configured to provide communication between the processor and at least the locator system;
   a data storage configured to store at least the one or more routines and to provide the one or more routines to the processor for execution; and
   a user interface configured to indicate at least the part and the location based on the one or more routines executed by the processor.

2. The installation system of claim 1, wherein the processor-based system is further configured to notify a remote site of the successful or unsuccessful installation of the part.

3. The installation system of claim 1, wherein the communication interface comprises at least one of a wireless connection, a modem connection, a satellite link, or a network connection.

4. The installation system of claim 1, wherein the communication interface communicates via at least one of a wire, a radio signal, an infrared signal, an optical signal, or a microwave signal.

5. The installation system of claim 1, wherein the data storage comprises at least one of a memory or a mass storage device.

6. The installation system of claim 1, wherein the locator system comprises at least one of a radio frequency identification (RFID) tracking system, an ultrasonic tracking system, or a global positioning system (GPS) tracking system.

7. A method, comprising:
   automatically determining a part of a device to be installed;
   automatically determining a location of the part;
   notifying an installer of the part and the location;
   retrieving the part;
   installing the part: and
   automatically updating a remote monitorin site based on the successful or unsuccessful installation of the part.

8. The method of claim 7, comprising:
   automatically determining an additional part of the device to be installed.

9. The method of claim 7, comprising:
   automatically verifying the successful or unsuccessful installation of the part.

10. The method of claim 7, wherein automatically determining the location of the part comprises querying a locator system configured to track at least the part.

11. A method for installing two or more parts of a device, comprising:
    locating a first part to be installed in the device using a first location provided by a project manager application;
    retrieving the first part from the first location;
    installing the first part in accordance with directions provided by the project manager application;
    locating a second part to be installed in the device using a second location provided by the project manager application;
    retrieving the second part from the second location; and
    installing the second part in accordance with directions provided by the project manager application.

12. The method of claim 11, comprising:
    indicating the installation of the part to the project manager application;
    locating a second part to be installed using a second location provided by the project manager application;
    retrieving the second part from the second location; and
    installing the second part in accordance with directions provided by the project manager application.

13. The method of claim 11, comprising:
    verifying the installation of the part using a diagnostic routine in communication with the project manager application.

14. The method of claim 11, comprising:
    updating a remote site of the successful or unsuccessful installation of the part.

* * * * *